(12) United States Patent
Powers et al.

(10) Patent No.: US 10,970,929 B2
(45) Date of Patent: Apr. 6, 2021

(54) BOUNDARY DETECTION USING VISION-BASED FEATURE MAPPING

(71) Applicant: Occipital, Inc., Boulder, CO (US)

(72) Inventors: Jeffrey Roger Powers, San Francisco, CA (US); Evan Haley Fletcher, Boulder, CO (US); Andrew Zimmer, Boulder, CO (US)

(73) Assignee: Occipital, Inc., Boulder, CO (US)

( * ) Notice: Subject to any disclaimer, the term of this patent is extended or adjusted under 35 U.S.C. 154(b) by 0 days.

(21) Appl. No.: 16/512,514

(22) Filed: Jul. 16, 2019

(65) Prior Publication Data

US 2020/0020157 A1 Jan. 16, 2020

Related U.S. Application Data

(60) Provisional application No. 62/698,632, filed on Jul. 16, 2018.

(51) Int. Cl.
*G06T 15/00* (2011.01)
*G06T 19/00* (2011.01)

(52) U.S. Cl.
CPC .......... *G06T 19/003* (2013.01); *G06T 19/006* (2013.01); *G06T 2200/08* (2013.01)

(58) Field of Classification Search
CPC .. G06T 19/003; G06T 19/006; G06T 2200/08
USPC ....................................................... 345/418
See application file for complete search history.

(56) References Cited

U.S. PATENT DOCUMENTS

| 8,442,805 | B2* | 5/2013 | Reem | G06T 17/20 |
| | | | | 703/2 |
| 9,081,385 | B1* | 7/2015 | Ferguson | G05D 1/0246 |
| 9,221,461 | B2* | 12/2015 | Ferguson | B60W 30/12 |
| 9,395,192 | B1* | 7/2016 | Silver | G06K 9/00798 |
| 9,697,730 | B2* | 7/2017 | Thakur | B62D 15/0285 |
| 9,841,285 | B2* | 12/2017 | Chau | G01C 21/3655 |
| 10,477,178 | B2* | 11/2019 | Leonard | G06T 17/20 |
| 2018/0188038 | A1* | 7/2018 | Yang | G06K 9/6212 |
| 2019/0020861 | A1* | 1/2019 | Leonard | G06T 7/593 |

(Continued)

OTHER PUBLICATIONS

Chen J, Luo C, Krishnan M, Paulik M, Tang Y. An enhanced dynamic Delaunay triangulation-based path planning algorithm for autonomous mobile robot navigation. InIntelligent Robots and Computer Vision XXVII: Algorithms and Techniques Jan. 18, 2010 (vol. 7539, p. 75390P). International Society for Optics and Photonics.*

(Continued)

*Primary Examiner* — Phu K Nguyen
(74) *Attorney, Agent, or Firm* — Lee & Hayes, P.C.

(57) ABSTRACT

A system configured to determine one or more boundaries of the space, for example, in 3D applications. In some cases, the system may generate point data including a set of safe points in a space and a set of unsafe points in the space, the space surrounding a user device of the system, generate a triangulation over a union of the set of safe points and the set of unsafe points, determine triangles of the triangulation that include at least one safe point and determine edges of determined triangles which are part of a single triangle that include at least one safe point. The system may then determine one or more boundaries of the space using the determined edges.

20 Claims, 13 Drawing Sheets

(56) References Cited

U.S. PATENT DOCUMENTS

2019/0294178 A1\* 9/2019 Oppermann ........... G01C 21/32
2020/0149906 A1\* 5/2020 Tu ........................ G05D 1/0289

OTHER PUBLICATIONS

Romanoni A, Matteucci M. Incremental reconstruction of urban environments by edge-points delaunay triangulation. In2015 IEEE/RSJ International Conference on Intelligent Robots and Systems (IROS) Sep. 28, 2015 (pp. 4473-4479). IEEE.\*
Kallmann M. Path planning in triangulations. InProceedings of the IJCAI workshop on reasoning, representation, and learning in computer games Jul. 31, 2005 (pp. 49-54).\*
Buffa, Michel & Faugeras, Olivier & Zhang, Zhengyou. (1992). A Complete Navigation System for a Mobile Robot, Using Real-Time Stereovision and the Delaunay Triangulation.. 191-194.\*
Anderson, Sterling J. "Constraint-based navigation for safe, shared control of ground vehicles." PhD diss., Massachusetts Institute of Technology, 2013.\*
Lovi D, Birkbeck N, Cobzas D, Jagersand M. Incremental free-space carving for real-time 3d reconstruction. InFifth international symposium on 3D data processing visualization and transmission (3DPVT) May 2010.\*
Delaunay triangulation—Wikepedia, https://en.wikipedia.org/wiki/Delaunay_triangulation, 9 pages.
Rosen et al., "Implementation of a fast and efficient concave hull algorithm," Project in Computational Science, Department of Information Technology, Jan. 31, 2014, 34 pages.

\* cited by examiner

800

BOUNDARY DETECTION USING VISION-BASED FEATURE MAPPING

CROSS-REFERENCE TO RELATED APPLICATION(S)

This application claims priority to U.S. Provisional Application No. 62/698,632 filed on Jul. 16, 2018 and entitled "Room Boundary Detection Using Vision-Based Feature Mapping," which is incorporated herein by reference in its entirety.

BACKGROUND

The presence of three dimensional (3D) imaging and virtual reality systems in today's world is becoming more and more common. In some cases, the imaging system or virtual reality system may be configured to allow a user to interact with the physical world or environmental in a meaningful manner. Many three-dimensional (3D) applications, especially virtual reality (VR) outside-in tracked applications, may include a boundary associated with a space to keep users from running into real world obstacles such as chairs, tables and walls.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
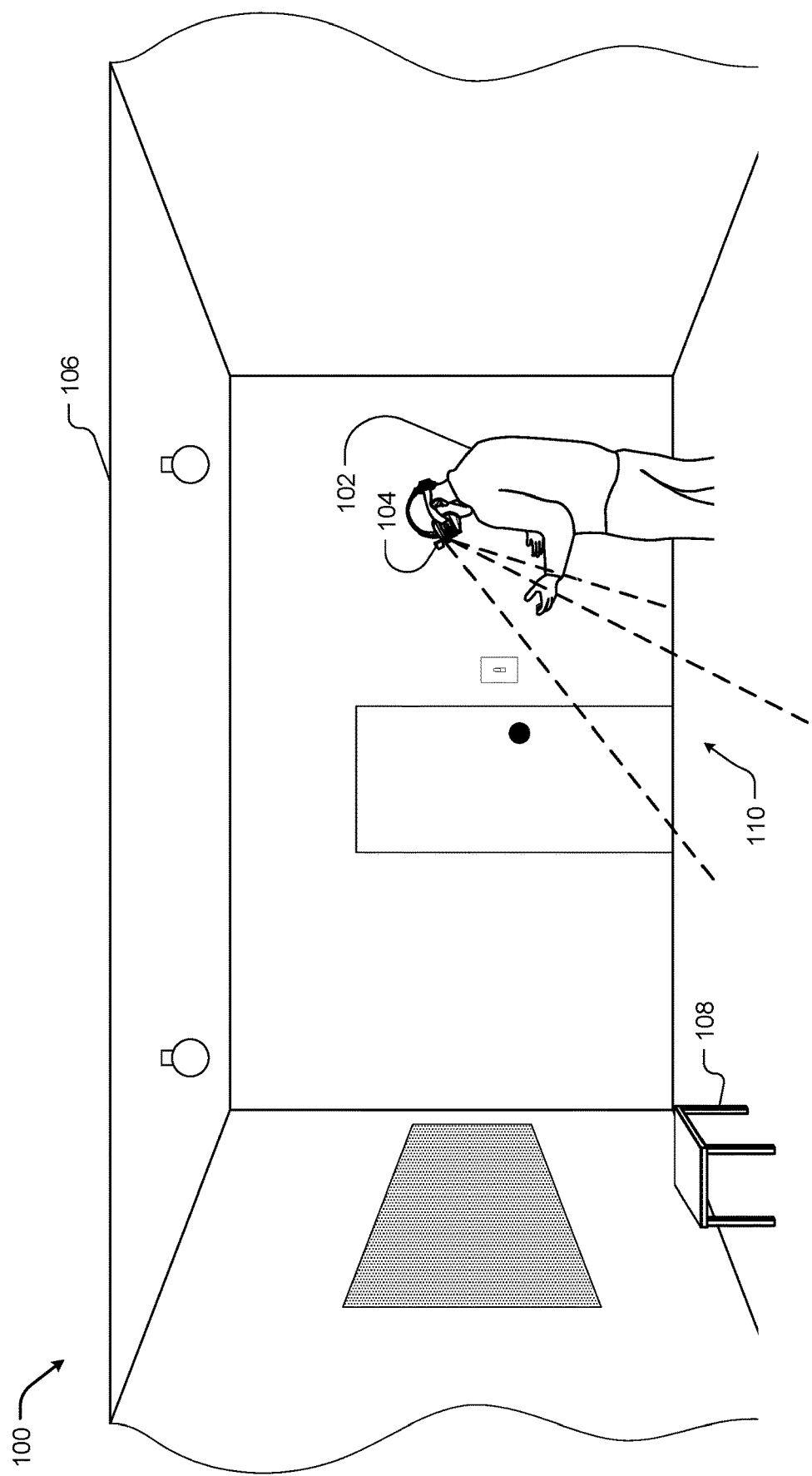
FIG. 1 illustrates an example boundary detection system for generating boundaries associated with a physical environment or space for a 3D application according to some implementations.

This disclosure includes techniques and implementations for utilizing computer vision to improve the detection for and generation of a boundary of a space. These boundaries may indicate or trace areas in the space in which a user may safely move without colliding with walls, furniture, or other obstacles, including "internal" obstacles surrounded by accessible space.

Systems and methods according to this disclosure may use a 3D representation of a space and tracked poses of a moving object to define boundaries of obstacle-free "safe" areas which the moving object may freely access. For example, devices and systems according to this disclosure may direct a user to move around a space while looking around. While the user does so, the device may perform detection of real world obstacles such as chairs, tables and walls and generate a boundary based thereon. In some examples, the device may detect points of scene geometry and determine points corresponding to known "safe" positions representing known points that are not inside obstacles. For example, safe points may be populated based on where the user or tracked object is standing in the space.

The system may utilize the detected points of scene geometry to determine unsafe points. More particularly, unsafe points may include detections representing the geometry of objects in the space.

In some examples, the unsafe points may be filtered based on, for example, each unsafe point's vertical position in the space, whether the unsafe points are contained inside a concave hull of the safe points, line of sight information from the device, or a combination thereof. Unsafe points may also be filtered by a confidence metric, or may be modified by other geometric understanding of the space. For example, detected unsafe points may be overridden by detected wall planes if nearby.

Some examples may utilize Delaunay triangulation to create a mesh of safe and unsafe regions in the space based on the safe points and unsafe points. The resulting mesh may then be used to generate a boundary around the safe area. In other cases, a symbolic perturbation method may be used to create the mesh of safe and unsafe regions.

For VR applications, systems and methods according to this disclosure may provide a better user experience as the setup process disclosed herein may be performed by, for example, a headset device with a passthrough camera feed without a messy floor height setup process and without the user manually drawing the boundaries of the space.

Further, systems and methods in accordance with this disclosure may allow for multiple boundaries (or boundary loops), which may allow the boundaries of the space to be setup with internal boundaries for obstacles such as tables, chairs, couches, and so on.

Systems and methods providing for such internal boundary loops may also utilize boundary visualization techniques which are different from external boundary visualization. For example, the interaction with internal obstacles such as tables, chairs, couches may differ from external boundaries (e.g. walls) in that internal obstacles may be avoided and bypassed while external boundaries correspond to the outside of the space and may not be bypassed. Thus, visualization techniques for internal obstacles may balance obstacle avoidance and immersion. For example, visualization may be performed to maintain immersion while allowing the user to avoid these obstacles even if they are below eye level. Some examples may use proximity and velocity to detect an impending collision with an internal boundary before the impending collision happens and make the obstacle corresponding to the internal boundary very obvious to the user in response to the impending collision detection. For instance, lines associated with the obstacle may be presented on a display to the user over a currently viewed virtual environment.

In some examples, data representing the points in the scene geometry may be generated by a visual-inertial simultaneous localization and mapping (SLAM) system that is, for example, included in a headset device worn by a user, but implementations are not limited by data source. Further, while implementations herein may relate to VR applications utilizing an inside-out visual simultaneous localization and mapping (SLAM) system, implementations are not limited to any application or input method.

Moreover, while implementations discussed herein relate to the collection of data by a single device, implementations are not so limited. For example, the system may have a centralized process or receiving information from user carried devices. In that case, multiple users may carry such devices and safe point data and scene geometry data may be captured by more than one device.

FIG. 1 illustrates an example boundary detection system 100 for generating boundaries associated with a physical environment or space for a 3D application according to some implementations. In the illustrated example, a user 102 may utilize a mobile device 104 to capture data related to the physical environment or space 106 in which the user 102 is located.

The captured data (such as image data, depth data, red-green-blue data, orientation data, acceleration data, previously generated 3D models, etc.) may include unsafe point data related to barriers (e.g. walls) and obstacles, such as table 108, in the physical environment or space 106. In some examples, the unsafe point data captured by the mobile device 104 may include feature points of objects, vertices in a mesh reconstruction, point clouds from a depth sensor or LIDAR, or any other detection of points on objects in the space that may be considered obstacles. In order to capture the unsafe point data, the mobile device 104 may include one or more sensor components to capture information about the physical environment in which the user 102 and mobile device 104 are located from substantially the perspective or view of the user 102 and/or the mobile device 104. Thus, in some cases, the mobile device 104 may capture the information about the physical environment based on a field of view 110 substantially similar to a field of view of the mobile device 104 and/or the user 102 as the user 102 moves about the physical environment.

In addition, the mobile device 104 may determine safe point data for the space. In some implementations, the mobile device 104 may record location data representing where the user moved in the space 106 during the capture of the data. For example, safe point data may be generated from a headset pose of the user 102 and mobile device 104 during the boundary setup process. The safe point data may be sampled from the mobile device 104 position at set time and distance intervals. In a particular example, safe point data may be sampled every 0.5 seconds or 10 centimeters travelled, whichever samples more frequently given instantaneous velocity.

The mobile device 104 may then process and filter the captured data. The processed and filtered data may then be utilized to generate boundaries for the 3D application. For example, the mobile device 104 may perform a Delaunay triangulation on a union of detected unsafe points (e.g. in the unsafe point data) and known-safe positions (e.g. from the safe point data), then process the resulting mesh into a safe boundary of space 106. The safe boundaries may trace areas of the space 106 where the user 102 can safely move without colliding with walls, furniture, or other obstacles, including "internal" obstacles (e.g. around table 108) surrounded by accessible space.

Once the boundaries have been determined, the mobile device 104 may enter an operational mode in which, for example, a virtual environment is displayed to the user 102. As the user 102 interacts with the virtual environment, the boundaries may be utilized to provide indications or warnings to the user 102 of potential collisions with barriers or obstacles in the space 108. In this way, the user may avoid collisions and potential injuries without engaging in a time-consuming manual setup process.

Figure 2:
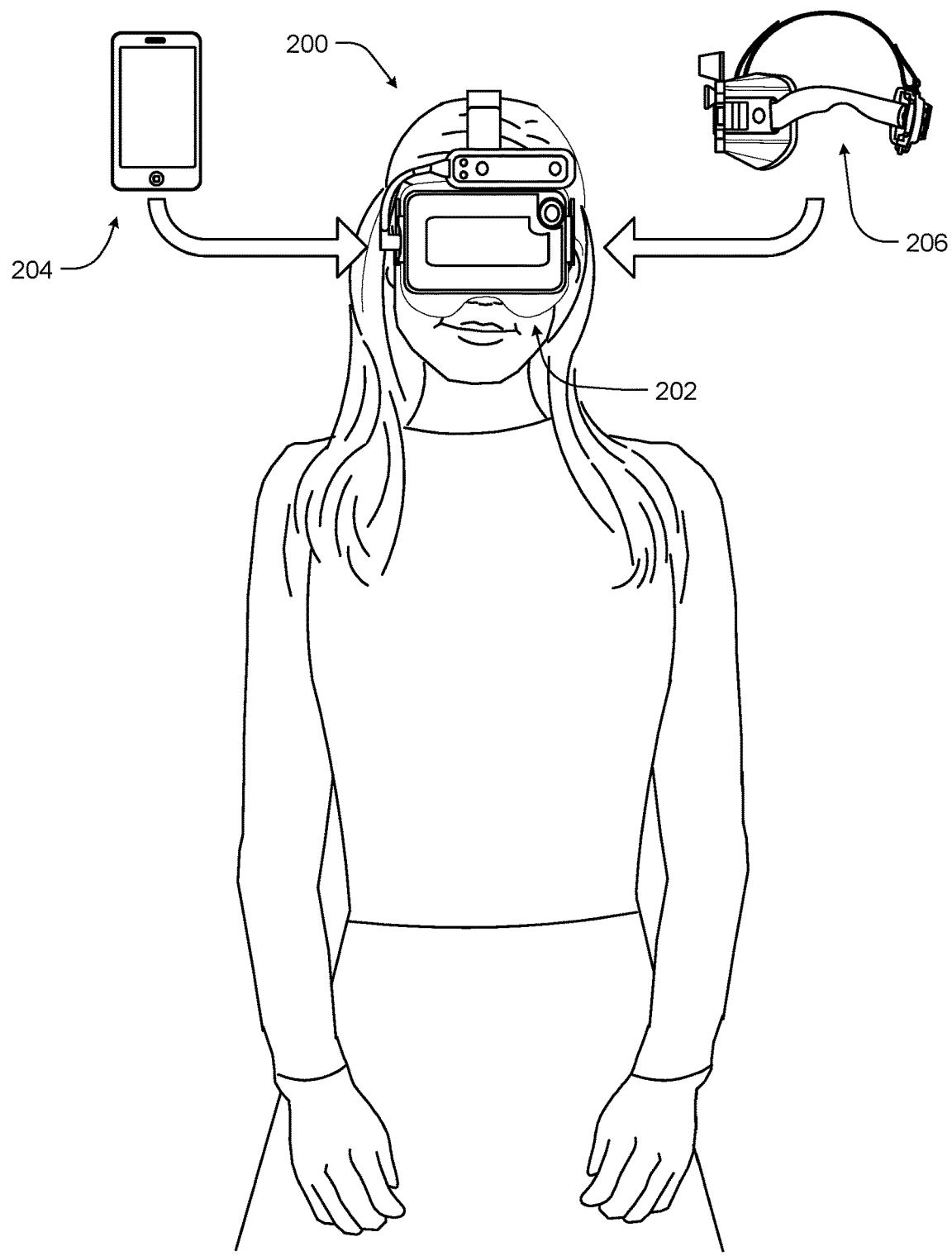
FIG. 2 illustrates an example user engaged with a virtual environment generated by a visualization system according to some implementations.

FIG. 2 illustrates an example user 200 engaged with a virtual environment generated by a visualization system 202 according to some implementations. In some implementations, the visualization system 202 may include an electronic device 204 and a headset device 206. For instance, the visualization system 202 may be modular, such that the headset device 206 may be compatible with a verity of electronic devices 204 having a virtual environment application installed. In some instances, the visualization system 202 may be configured to provide an enclosed environment from which the virtual environment may be viewed, while in other instances, the visualization system 202 may be an open air design. In one particular implementation, the visualization system 202 may be convertible from an open air system to an enclosed system. In other examples, the visualization system 202 may be a self-contained unit that includes processing resources, sensors or image components, displays, lenses, projects, etc. In this example, the visualization system 202 may take other forms, such as a handheld system or other designs that may or may not fit on the user's 200 head.

As discussed above, in one example, the electronic device 204 may be a portable electric device, such as a tablet, netbook, laptop, cell phone, mobile phone, smart phone, etc. that includes processing and storage resources, such as processors, memory devices, and/or storage devices. The headset 206 may include components configured to secure the electronic device 204 in a manner viewable by the user 200 as well as sensors, measurement units or devices, and image components for capturing images and/or video from a physical environment. In some cases, the headset 206 may also include projectors to, for instance, project a grid or pattern within the physical environment to assist with determining positions and surfaces of the physical environment. For instance, the visualization system 202 may be configured to perform operations, such as structured light, to detect objects in the space 106, such as stationary objects (e.g., walls, furniture, etc.). In some specific examples, the headset 206 may also be equipped with specialized viewing lenses that together with the display of the electronic device 202 cause the user 200 to experience the virtual environment in 3D.

Figure 3:
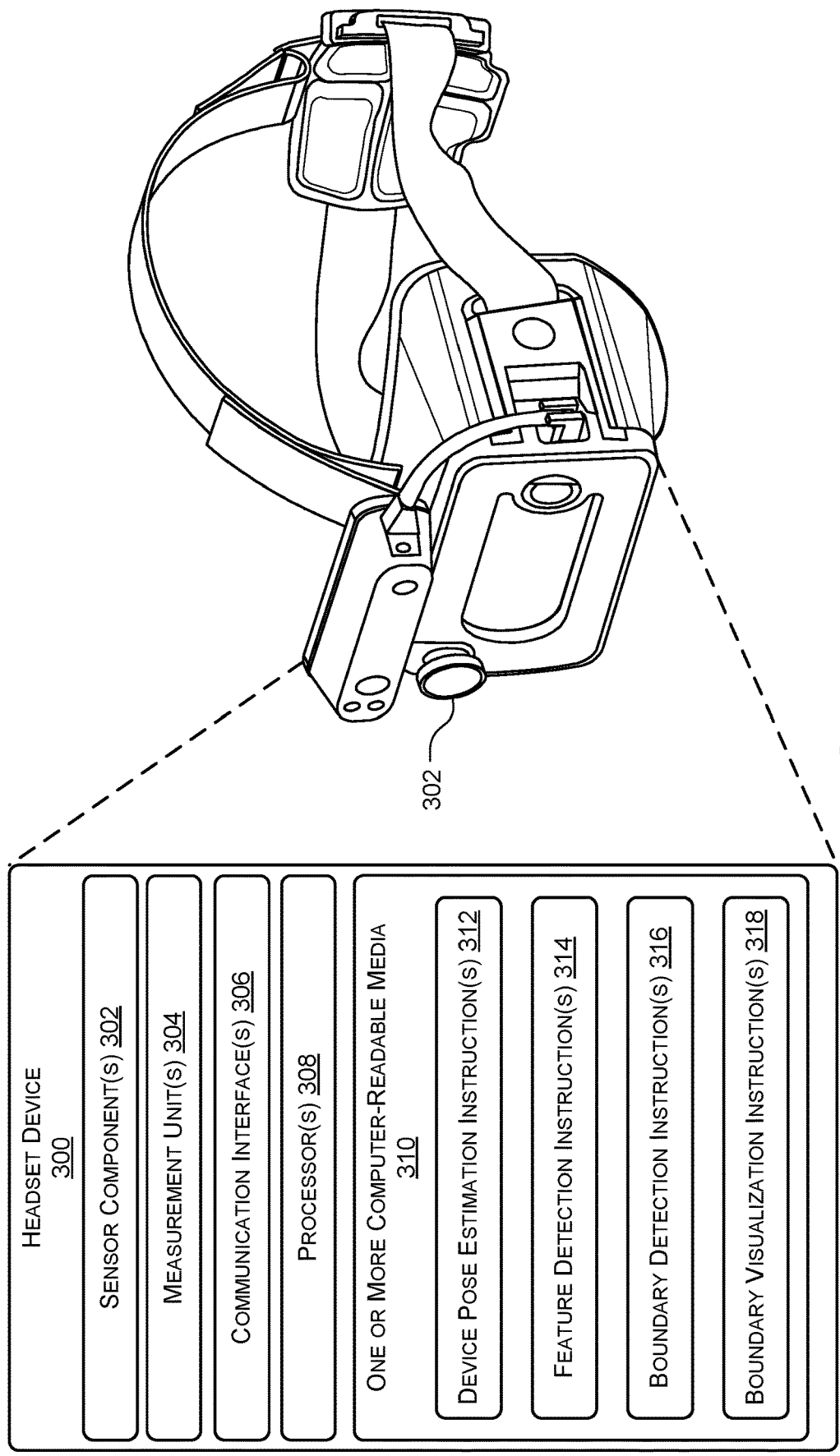
FIG. 3 is an example headset device according to some implementations.

FIG. 3 is an example headset device 300 according to some implementations. As described above, the headset device 300 may be a combination of an electronic device and a headset or be a self-contained unit. In the current example, the headset device 300 may include sensor components 302 for capturing data, such as feature points of objects, vertices in a mesh reconstruction, point clouds from, for instance, a depth sensor or LIDAR, or any other detection of points on objects in the space that may be considered obstacles, from a physical environment. For example, the sensor components 302 may be positioned to capture depth or scene geometry data from substantially the same perspective as the user (e.g., a position proximate the user's eyes or head) in order to incorporate the data associated with the captured data into the virtual environment. The sensor components 302 may be of various sizes and quality. For instance, the sensor components 302 may include one or more depth and geometry sensors such as a stereo camera system, a monocular SLAM system, a depth camera, and a LIDAR or other ranging system. In general, the sensor components 302 may each include various components and/or attributes.

In some cases, the headset device 300 may include one or more measurement units 304 that may determine orientation data of the headset device 300 (e.g., acceleration, angular momentum, pitch, roll, yaw, etc. of the headset device 300). The measurement units 304 may include one or more IMUs, one or more accelerometers, one or more gyroscopes, one or more magnetometers, and/or one or more pressure sensors, as well as other sensors. In one particular example, the measurement units 304 may include three accelerometers placed orthogonal to each other, three rate gyroscopes placed orthogonal to each other, three magnetometers placed orthogonal to each other, and a barometric pressure sensor.

The headset device 300 may also include one or more communication interfaces 306 configured to facilitate communication between one or more networks, one or more cloud-based management system, and/or one or more physical objects. The communication interfaces 306 may also facilitate communication between one or more wireless access points, a master device, and/or one or more other computing devices as part of an ad-hoc or home network system. The communication interfaces 306 may support both wired and wireless connection to various networks, such as cellular networks, radio, WiFi networks, short-range or near-field networks (e.g., Bluetooth®), infrared signals, local area networks, wide area networks, the Internet, and so forth.

The visualization system 300 may also include one or more processors 308, such as at least one or more access components, control logic circuits, central processing units, or processors, as well as one or more computer-readable media 310 to perform the function associated with the virtual environment. Additionally, each of the processors 308 may itself comprise one or more processors or processing cores.

Depending on the configuration, the computer-readable media 310 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 308.

Several modules such as instructions, data stores, and so forth may be stored within the computer-readable media 310 and configured to execute on the processors 308. For example, as illustrated, the computer-readable media 310 store device pose estimation instructions 312, feature detection instructions 314, boundary detection instructions 316 and boundary visualization instructions 318.

The device pose estimation instructions 312, when executed by the processor 308 may cause the processor 308 to perform operations to determine the pose of the headset device 300 (e.g. the position and orientation of the headset device 300 in relation to the space or virtual environment). For instance, the device pose estimation instructions 312 may cause the processor 308 to determine the pose of the headset device 300 every 0.5 seconds or 10 centimeters travelled, whichever samples more frequently given instantaneous velocity. In some examples, the pose of the headset may be determined by the device pose estimation instructions 312 based on information provided by the measurement units 304. Once determined, the location and orientation of the headset device 300 represented by the pose may be stored. Some examples may utilized the stored location and orientation of the headset device 300 to determine safe point data which may be used in determining boundaries for the space.

The feature detection instructions 314 may be configured to determine point data using information from sensor components 302 and data generated by the pose estimation instructions 312. As discussed above, the point data may include unsafe point data related to barriers and obstacles, such as table 108, in the physical environment or space 106. In some examples, the unsafe point data determined by the feature detection instructions 314 may include feature points of objects, vertices in a mesh reconstruction, point clouds from a depth sensor or LIDAR, or any other detection of points on objects in the space that may be considered obstacles.

In addition, the feature detection instructions 314 may determine safe point data in the space. In some implementations, the feature detection instructions 314 may utilize the stored pose data representing the orientation of the headset and where the user moved in the space during the setup process to determine safe points that represent areas in the space that are accessible to the user. As mentioned above, the pose data may be sampled and safe point data may be determined by the feature detection instructions 314 at set time and distance intervals. In a particular example, safe point data may be determined every 0.5 seconds or 10 centimeters travelled, whichever provides more frequent information given instantaneous velocity.

The feature detection instructions 314 may then process and filter the point data (e.g. the unsafe point data and safe point data). For example, the unsafe point data may be filtered based on proximity to detected vertical planes, metadata associated with detected unsafe points (e.g. surface area, extent, and orientation of planes on which the unsafe points lie, length and orientation of line features, or confidence metrics), vertical positioning of the unsafe points, and by generating a concave hull using safe points and removing surrounded unsafe points inside the concave hull.

In addition, the feature detection instructions 314 may generate additional safe points based on line of sight information determined from the line of sight between a safe point where the headset device 300 is located and the location of unsafe points captured from the safe point (e.g. the area of the space corresponding to the unobstructed line of sight may be determined safe).

The feature detection instructions 314 may then project the remaining unsafe points representing obstacles and all of the safe points to a horizontal plane.

The boundary detection instructions 316 may utilize the processed and filtered point data to generate boundaries for the space. For example, the boundary detection instructions 316 may perform a Delaunay triangulation on a union of detected unsafe points (e.g. in the unsafe point data) and known-safe positions (e.g. from the safe point data), then process the resulting mesh into safe boundaries. The safe boundaries may trace areas of the space where the user can safely move without colliding with walls, furniture, or other obstacles. The boundaries may include internal boundaries around obstacles surrounded by accessible space (e.g. furniture or within the space).

The boundary visualization instructions 318 may utilize the boundaries determined by the boundary detection instructions 316 during an operational mode in which, for example, a virtual environment is displayed to the user of the headset device 300. As the user interacts with the virtual environment, the boundaries may be utilized to provide indications or warnings to the user 102 of potential collisions with barriers or obstacles in the space 108.

Figure 4:
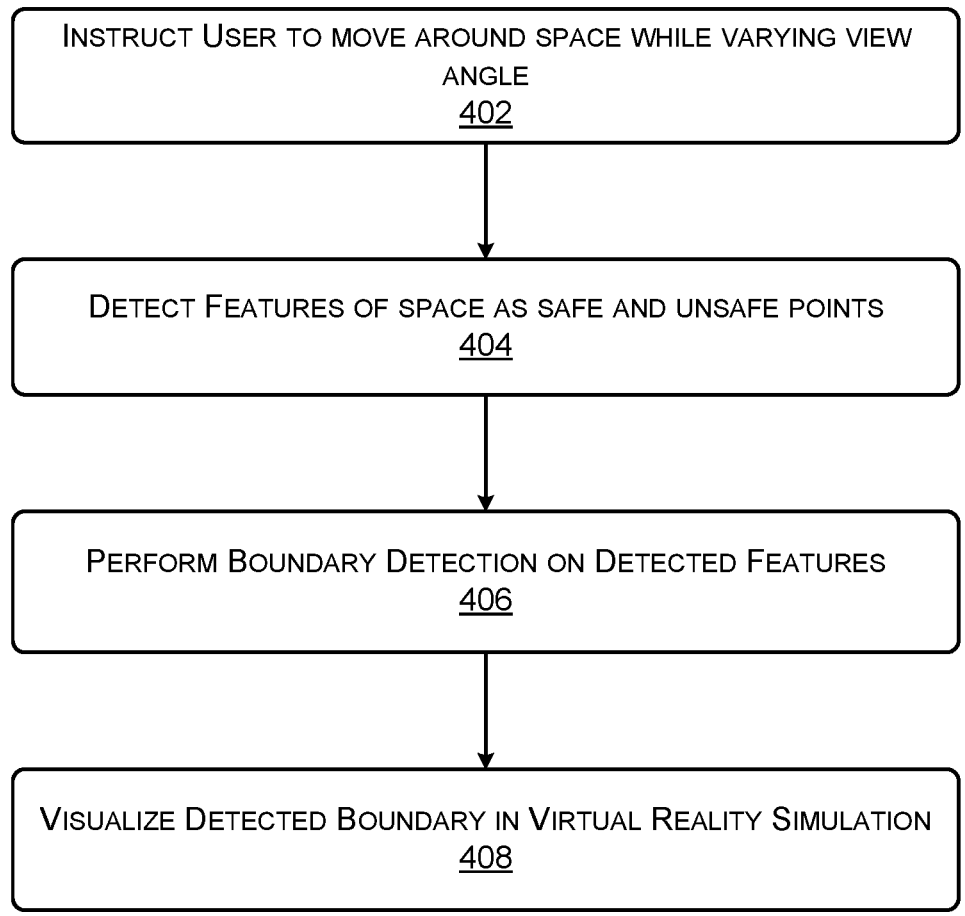
FIG. 4 is a flow diagram showing an illustrative process for determining a determining and using boundaries in a 3D application according to some implementations.
Figure 5:
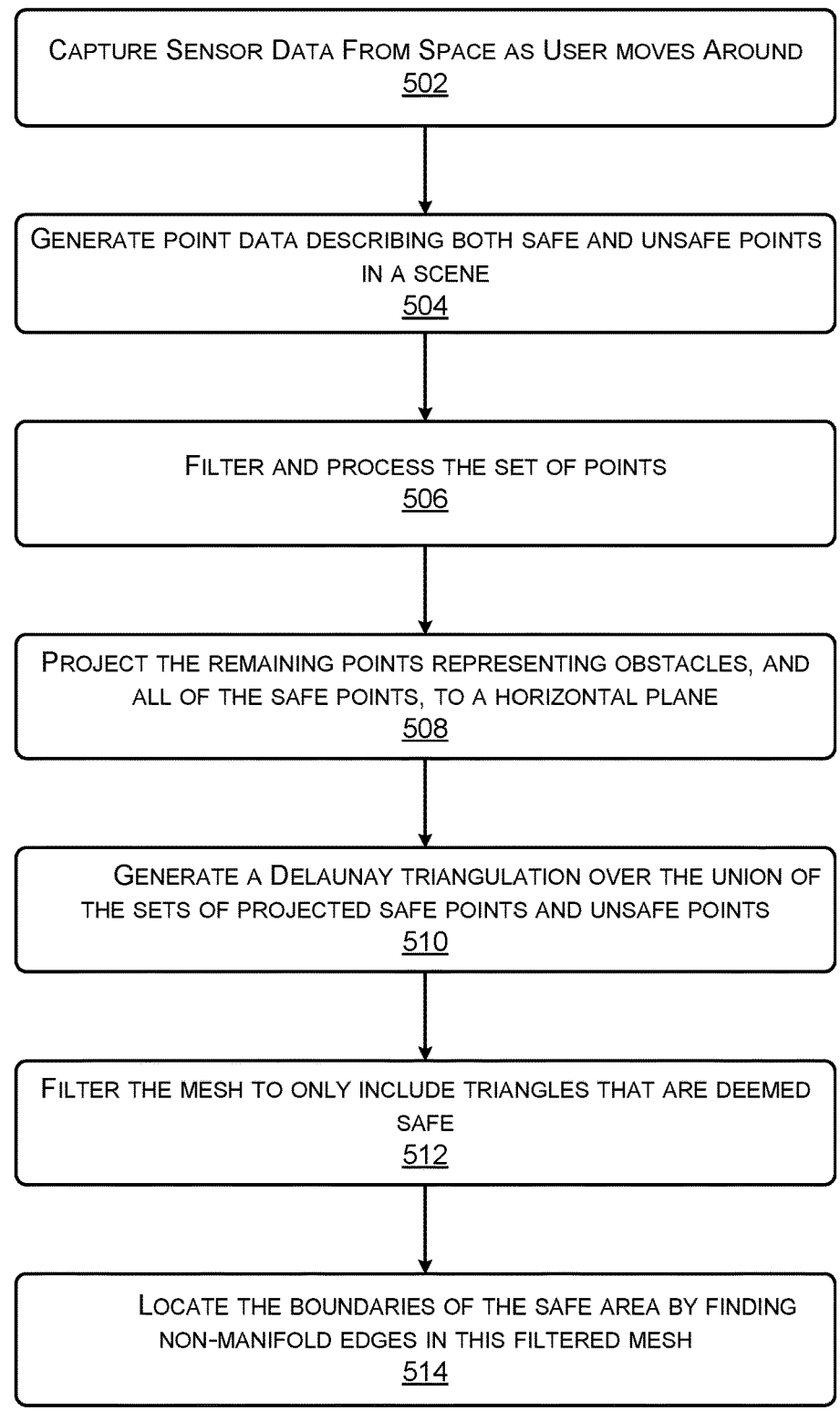
FIG. 5 is an example flow diagram showing an illustrative process for determining boundaries in an environment according to some implementations.
Figure 13:
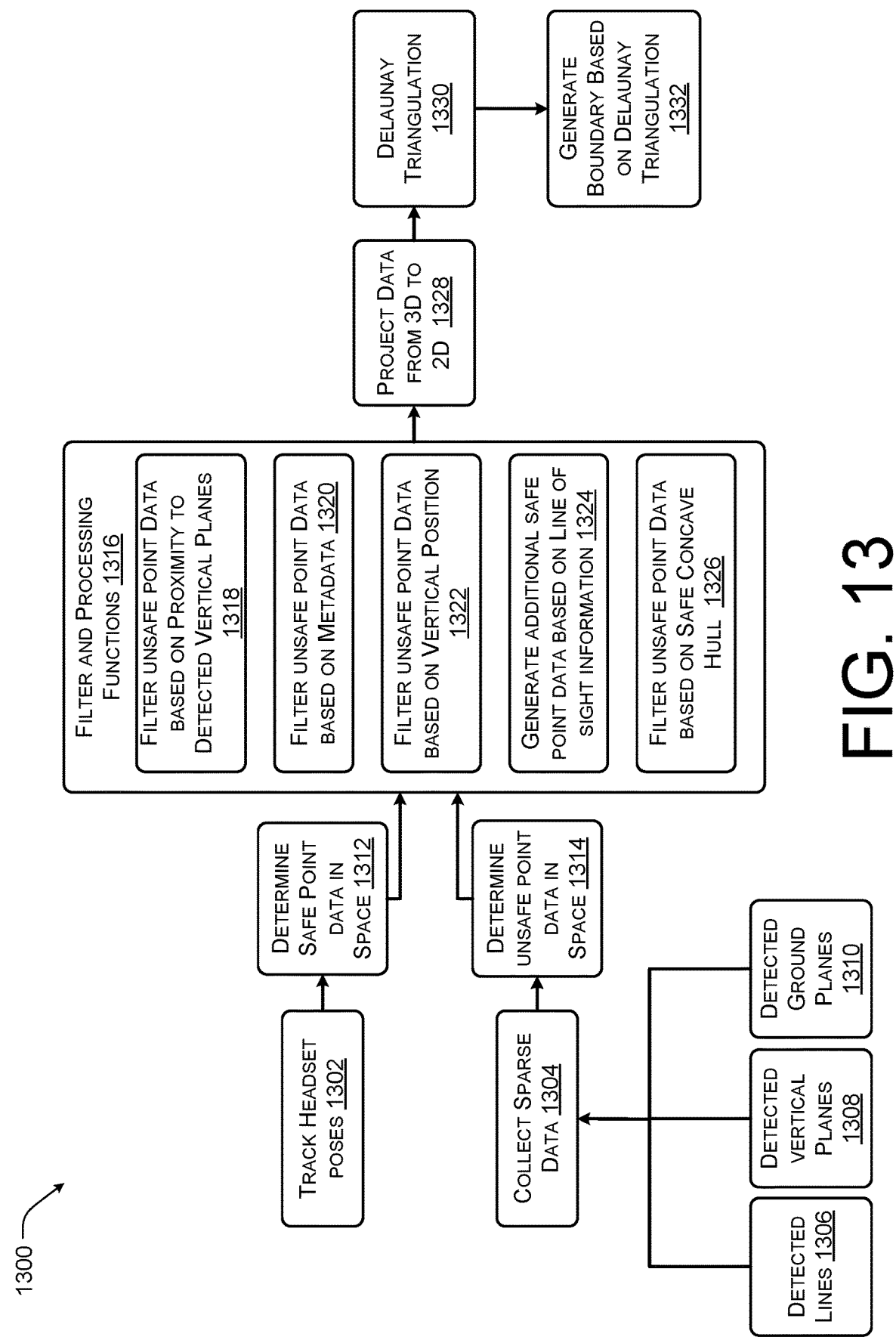
FIG. 13 is another example data flow diagram showing an illustrative data flow for determining boundaries in an environment according to some implementations

FIGS. 4-5 and 13 are flow diagrams illustrating example processes associated with determining boundaries in an environment according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 4 is an example flow diagram showing an illustrative process 400 for determining a determining and using boundaries in a 3D application according to some implementations. As discussed above, described herein is a visualization system that may be configured to determine boundaries in an environment or space. For example, a headset device worn by user may capture data related to the scene geometry of a space as the user walks through safe or accessible areas of the space. The captured data and safe area data may be utilized to determine boundaries for the 3D application.

At 402, the visualization system may display a request to the user to move around the space while varying the user's view angle. At 404, the visualization system may detect features of the space as safe and unsafe points as the user moves around the space while varying the users view angle. For example, the visualization system may include or be equipped with various sensor components and measurement components which may provide data for use in determining the safe and unsafe points. The visualization system may also perform filtering and other processes on the detected safe and unsafe points. The visualization system may then project the remaining unsafe points representing obstacles and all of the safe points to a horizontal plane. In some cases, points may be removed if the points are outside of a threshold of the horizontal plane, result in physically impossible or highly unlikely in a physical environment, etc.

At 406, the visualization system may perform boundary detection on the detected features. For example, the visualization system may perform a Delaunay triangulation on a union of detected unsafe points (e.g. in the unsafe point data) and known-safe positions (e.g. from the safe point data), then process the resulting mesh into safe boundaries. For example, the mesh or point cloud may be merged into regions, that may be in turn merged into larger regions forming the safe and unsafe boundaries. The safe boundaries may trace areas of the space where the user can safely move without colliding with walls, furniture, or other obstacles. The boundaries may include internal boundaries around obstacles surrounded by accessible space (e.g. furniture or within the space).

At 408, the visualization system may utilize the boundaries determined at 406 in, for example, in a virtual reality simulation. For example, as the user interacts with the virtual reality simulation, the boundaries may be utilized to provide indications or warnings to the user of potential collisions with barriers or obstacles in the space.

FIG. 5 is an example flow diagram showing an illustrative process 500 for determining boundaries in an environment according to some implementations. More particularly, process 500 provides additional details related to the operation of some examples of the systems and methods disclosed herein. During the discussion of process 500, FIGS. 6-12 may be discussed to provide a visual example of the operations.

At 502, the visualization system may capture sensor data from the space as the user moves around. As discussed above, the user may be instructed by the visualization system to perform such actions.

At 504, the visualization system may generate point data describing both safe and unsafe points in a scene. As discussed above, "unsafe" points may be based on detections representing geometry of objects in the scene which may correspond to obstacles or barriers. "Safe" points may be locations or points known to be free of obstacles in the context of the scene; these may be based on the tracked positions of a headset.

As mentioned above, the unsafe points may be sparse feature points on objects, vertices in a mesh reconstruction, point clouds from a depth sensor or LIDAR, or any other data that may represent points of objects in space that could be considered obstacles. In an example implementation of a sparse SLAM system which may find 3D feature points, lines, and planes on world geometry, the visualization system may generate unsafe points using detected lines and detected planes in world space.

The visualization system may utilize detected lines to generate unsafe points at set distances along the line segment, such as every 10 cm along the line, and at both endpoints. In some examples, these points may be removed from the set of unsafe points if the points within a threshold (e.g. 10 cm) of a detected plane, as the confidence and geometric accuracy of the plane may be higher than that of the detected line.

The visualization system may utilize detected planes in a similar manner. In particular, the visualization system may generate unsafe points at set distances every 0.1 meters along intersections of the detected plane and a horizontal plane(s) at height(s) deemed reasonable for obstacles (e.g. a height that will not be filtered out as a non-obstacle by the unsafe point filtering process below).

The visualization system may generate safe points based on the user's headset pose during the setup process. As mentioned above, the headset pose may include the location of the headset with in the space and the orientation of the headset. The safe points may be sampled from the headset device position at set time and distance intervals (e.g. every 0.5 seconds or 10 centimeters travelled, whichever samples more frequently given instantaneous velocity).

Figure 6:
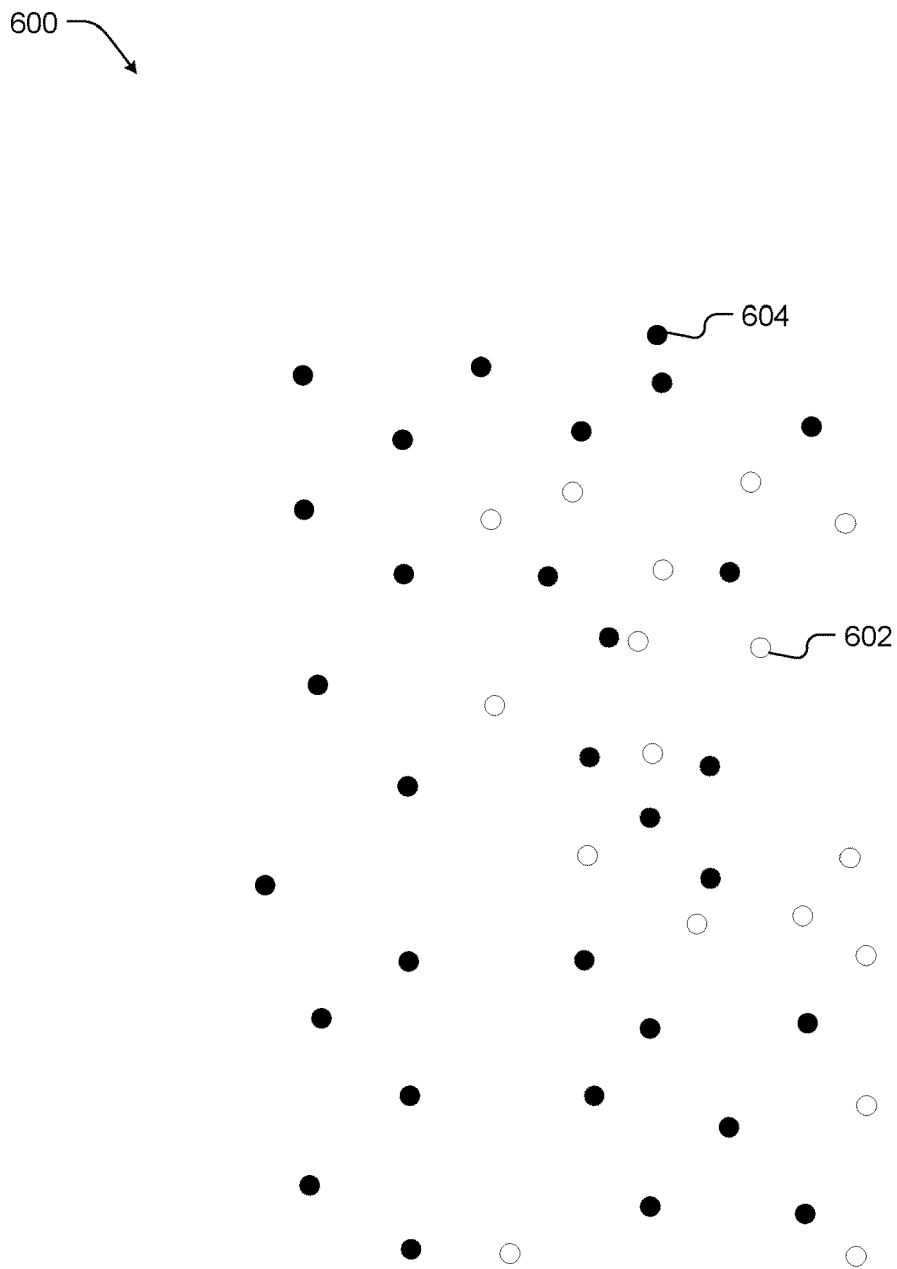
FIGS. 6-12 illustrates example point data including safe points and unsafe points being utilized to determine boundaries in an environment using the techniques discussed with respect to FIGS. 1-5 according to some implementations.

FIG. 6 provides an illustration of a set of points 600 that may be generated by visualization systems according to some implementations. For the purposes of the discussion of FIGS. 6-12, the set of points may represent point data captured from a portion of the space 106 of FIG. 1. In particular, the set of points may correspond to point data captured in the area of the room shown in FIG. 1 below the wall mounted display and including the table 108. The illustrated view of FIGS. 6-12 may represent a top-down view perpendicular to the floor of the space 106. While shown in two-dimensions for ease of illustration understanding, the point data of the set of points may also include vertical position data.

As illustrated, empty circles, such as point 602, may represent safe points in the space 106 and filled circles, such as 604, may represent unsafe points which may correspond to detected scene geometry of the space 106.

Returning to FIG. 5, at 506, the visualization system may filter and process the set of unsafe and safe points described by the point data. In some cases, one or more of the points detected by a vision system may not be useful in the context of boundary generation. For example, an unsafe point may be on the ceiling or floor, rather than on furniture or other obstacles or barriers. The visualization system may utilize a number of filtering methods to reduce the set of points considered unsafe. In addition, the safe points may be inferred or estimated based on known information such as line of sight. The visualization system may add these inferred or estimated safe points to the set of points. The discussion of filtering and processing the set of points provided below is discussed in the context of FIG. 7.

Figure 7:
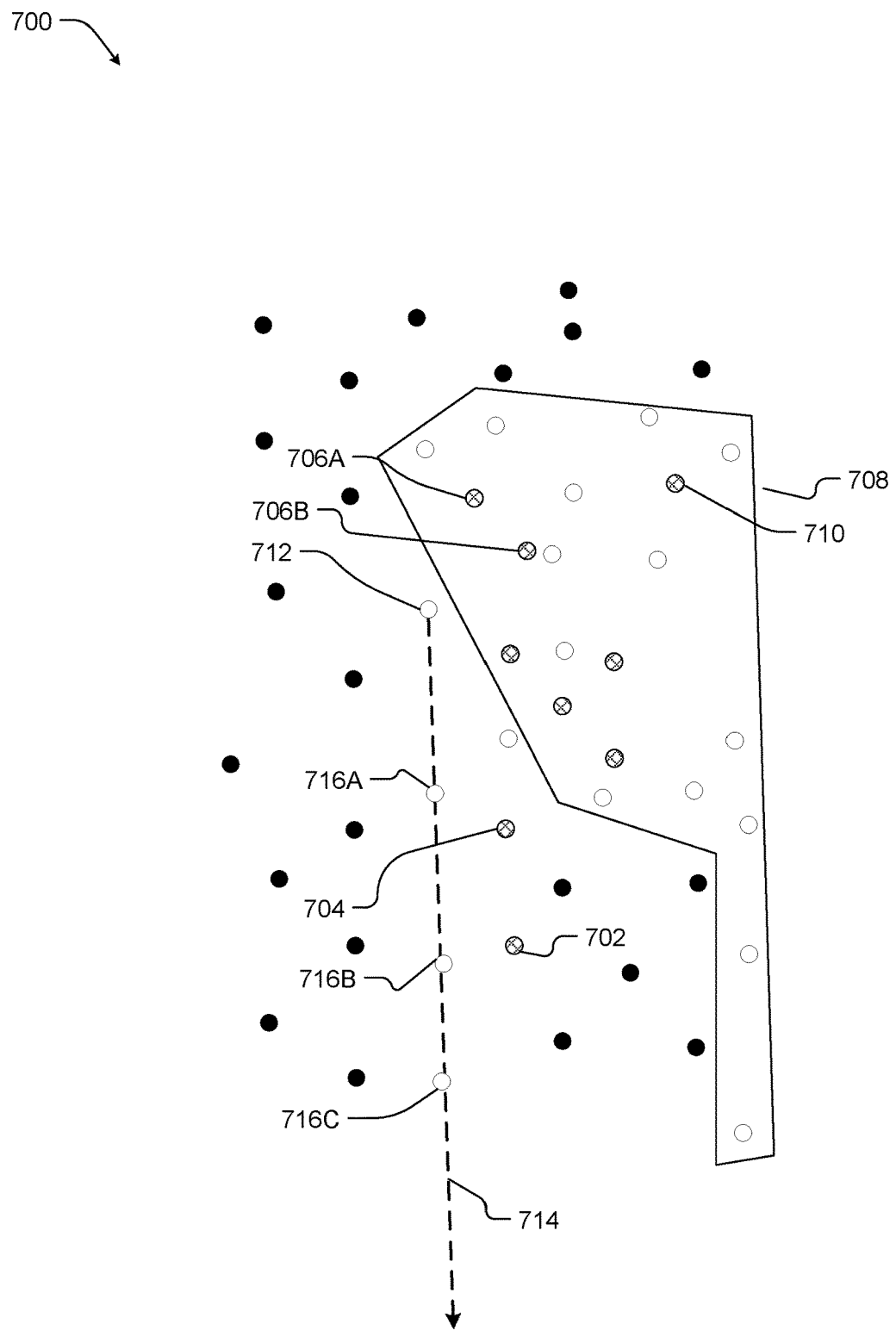

FIG. 7 provides an illustration of the set of points 700 that may be generated by visualization systems according to some implementations. More particularly, the set of points 700 may represent the set of points 600 following filtering and processing at 506. Unsafe points selected for removal by the visualization system are shown with crosshatch (e.g. points 702-710).

In a first filtering operation, the visualization system may utilize vertical position of unsafe points with respect to a ground plane to filter the unsafe points. For example, the visualization system may determine that unsafe points located below the ground plane, or less than a threshold above the ground plane may be removed. In the illustrated set of points 700, point 702 may represent an unsafe point determined to be below the ground plane or less than a threshold above the ground plane.

In addition, the visualization system may also filter out points that may be more than a human-reach threshold above the ground plane, or more than a threshold distance above the positions of the, for example, headset device of the visualization system during the setup process. In the illustrated set of points 700, point 704 may represent an unsafe point detected from the light fixture substantially above the table 108. In some examples, the visualization system may determine that the point 704 is more than a human-reach threshold above the ground plane, or more than a threshold distance above the positions of the headset device.

In a second filtering operation, the visualization system may utilize metadata associated with detected unsafe points to remove unsafe points. For example, metadata such as the surface area, extent, and orientation of any planes on which the unsafe points lie, the length and orientation of line features, or confidence metrics may be used to decide whether a particular unsafe point should remain in the set of points 700. In the illustrated set of points 700, points 706A and 706B may represent points removed based on metadata.

In a third filtering operation, the visualization system may draw a concave hull 708 around the detected safe points. In some examples, a convex hull (also known as a convex envelope or a convex closure) for a set X of points in the Euclidean plane or in a Euclidean space (or, more generally, in an affine space over the reals) may be the smallest convex set that contains X. One of ordinary skill in the art would understand how to draw a concave hull around the detected safe points in view of this disclosure.

The visualization system may then determine whether any of the unsafe points inside the concave hull 708 are isolated or surrounded by safe points. In the illustrated set of points 700, unsafe point 710 may be determined to be surrounded by safe points. The visualization system may remove the unsafe points determined to be surrounded. As such, point 710 may be marked for removal. In some examples, the removal of unsafe points surrounded by safe points within the concave hull may allow the visualization system to remove spurious detections without removing internal boundaries that represent obstacles such as the table 108 in space 106.

The above described filtering operations are merely examples and various implementations may include additional or alternative filtering processes.

As discussed above, the visualization system may generate additional safe points which may be inferred or estimated based on conditional information available to the visualization system.

For example, the visualization system may generate additional safe points using line of sight information. More particular, if the headset device is oriented towards an unsafe point (e.g. representing an obstacle or barrier) and there is open space between the headset device and the unsafe point, the visualization system may insert additional safe points along the line of sight between the headset device in the unsafe point. The inclusion of the additional safe points may improve the resulting boundaries for the space. For example, the additional safe points may allow boundaries generated based on the additional safe points to extend closer to the real geometry of the space and may reduce amount of the user must traverse the space while changing the orientation of the headset device. In the illustrated set of points 700, items 712-716C relate to this process.

More particular, the visualization system may determine that the headset device was positioned at safe point 712 when the visualization system detected an unsafe point in the direction indicated by arrow 714 which represents the clear line of sight to the unsafe point. Based on the clear line of sight 714, the visualization system may add safe points 716A-716C.

The above described operation to generate additional safe points is merely an example and various implementations may include additional or alternative processes for generating additional safe points based on inferences from known data.

Figure 8:
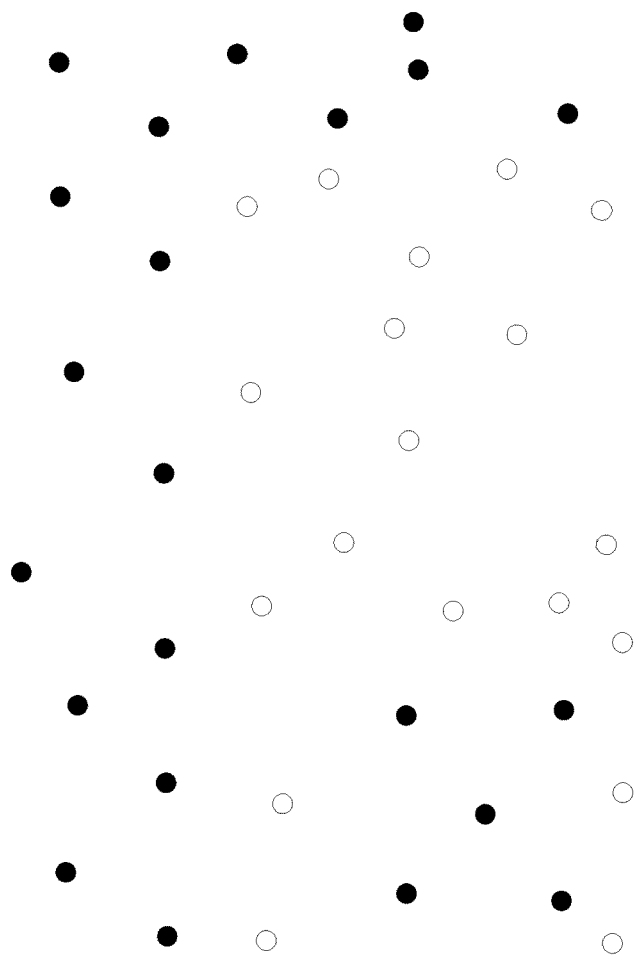

Returning to FIG. 5, at 508, the visualization system may project the process and filtered set of points to a horizontal plane. FIG. 8 provides an illustration of the set of points 800 that may be generated by visualization systems according to some implementations. More particularly, the set of points 800 may represent the set of points 800 following removal of filtered unsafe points (e.g. points 702-710) and the inclusion of additional safe points (e.g. points 716). In addition, the set of points 800 may have been projected to a horizontal plane parallel to the floor of space 106.

Next, at 510, the visualization system may generate a Delaunay triangulation over the union of the sets of projected safe points and unsafe points. The resulting Delaunay mesh may have the advantage of connecting nearby points in a way that preserves boundaries, but which may also allow easy isolation of boundary points by surrounding them with safe points.

A Delaunay triangulation for a given set P of discrete points in a plane may be a triangulation DT(P) such that no point in P is inside the circumcircle of any triangle in DT(P). Delaunay triangulations may maximize the minimum angle of all the angles of the triangles in the triangulation and may avoid sliver triangles. One of ordinary skill in the art would understand how to implement a Delaunay triangulation for the safe and unsafe points in view of this disclosure.

Figure 9:
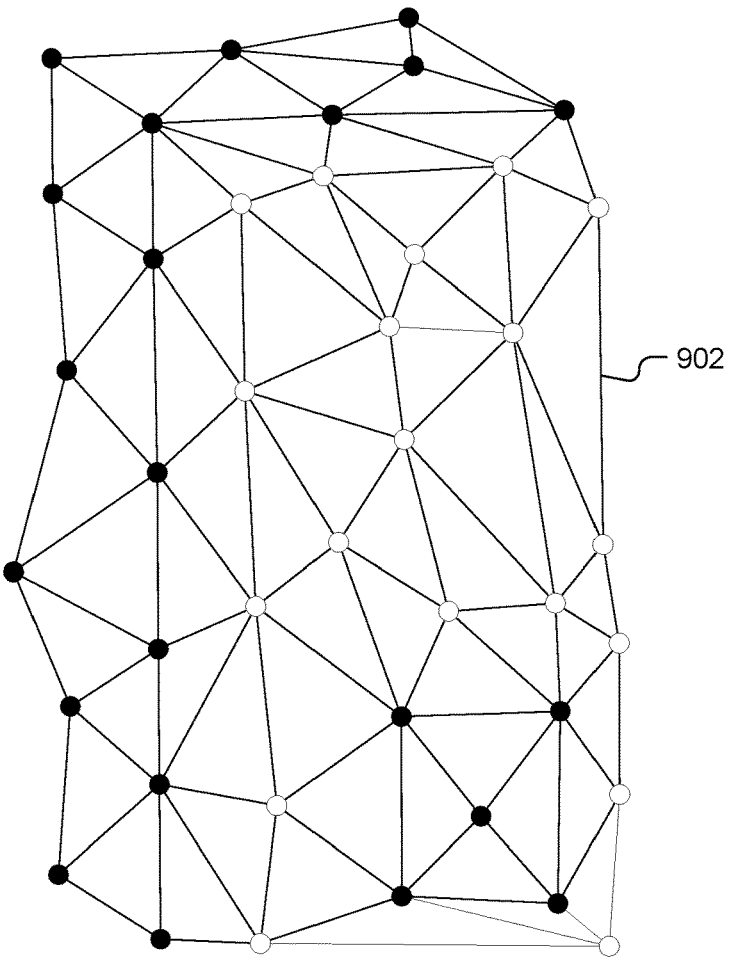

FIG. 9 provides an illustration of the set of points 900 that may be generated by visualization systems according to some implementations. More particularly, the set of points 900 may represent the set of points 800 following the Delaunay triangulation at 510. As illustrated, connectors 902 connect the safe and unsafe points into a mesh in accordance with the triangulation algorithm. It should be noted that the interconnections illustrated in FIGS. 9-12 are approximated and illustrative and not intended to represent an exact triangulation that would be generated for the set of points 900.

Returning to FIG. 5, at 512, the visualization system may filter the Delaunay mesh to include triangles that may be "safe" triangles. As used herein, "safe triangles" may refer to triangles that contain at least one safe point. As such, the Delaunay mesh may be filtered by selecting all triangles that contain at least one safe point and ignoring triangles that do not contain a safe point. The resulting "safe mesh" may include boundaries that describe the boundaries of the detected safe space.

Figure 10:
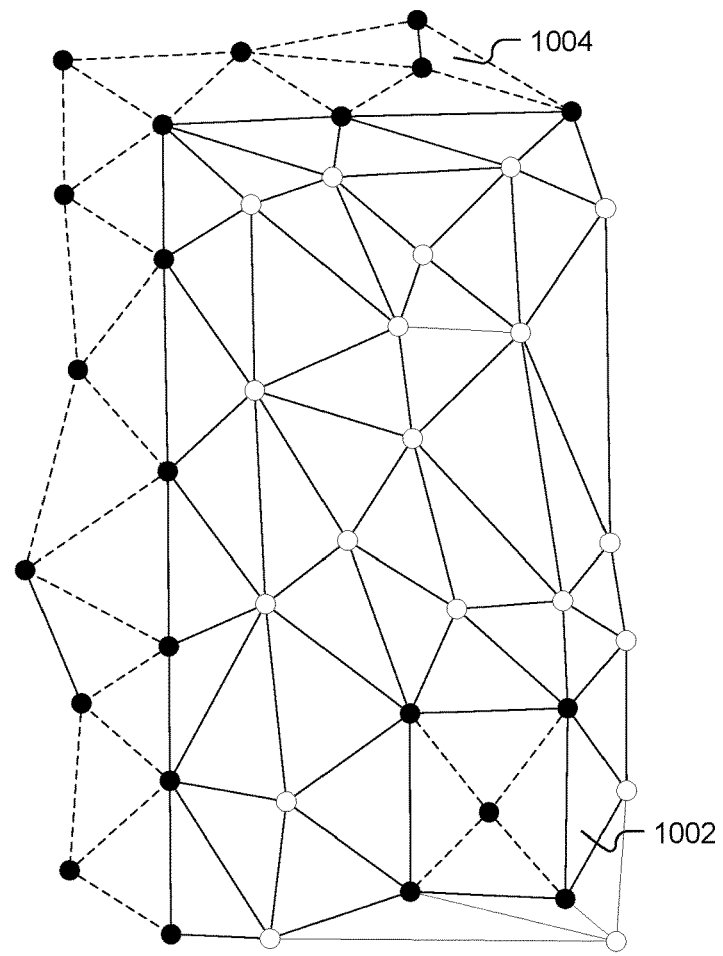

FIG. 10 provides an illustration of the set of points 1000 that may be generated by visualization systems according to some implementations. More particularly, the set of points 1000 may represent the set of points 900 following the filtering of the Delaunay mesh at 512 to select the safe triangles (e.g. to generate a safe mesh). As shown in FIG. 10, triangles that include a safe point, such as triangle 1002, remain selected (e.g. shown as solid lines) while triangles that do not include a safe point, such as triangle 1004, are ignored (e.g. shown as dashed lines).

Returning to FIG. 5, at 512, the visualization system may locate the boundaries of the safe area by finding non-manifold edges in the safe mesh (e.g. edges that are only used in one selected triangle (e.g. in one safe triangle)). In some examples, the visualization system may mark all edges that are only used in one selected triangle (e.g. in one safe triangle). The unmarked edges of the safe mesh may then be ignored or removed and the marked edges may be sorted to line up to find the boundaries of the space. This resulting safe mesh may include all boundaries of the safe area of the space, including internal boundaries around objects.

Figure 11:
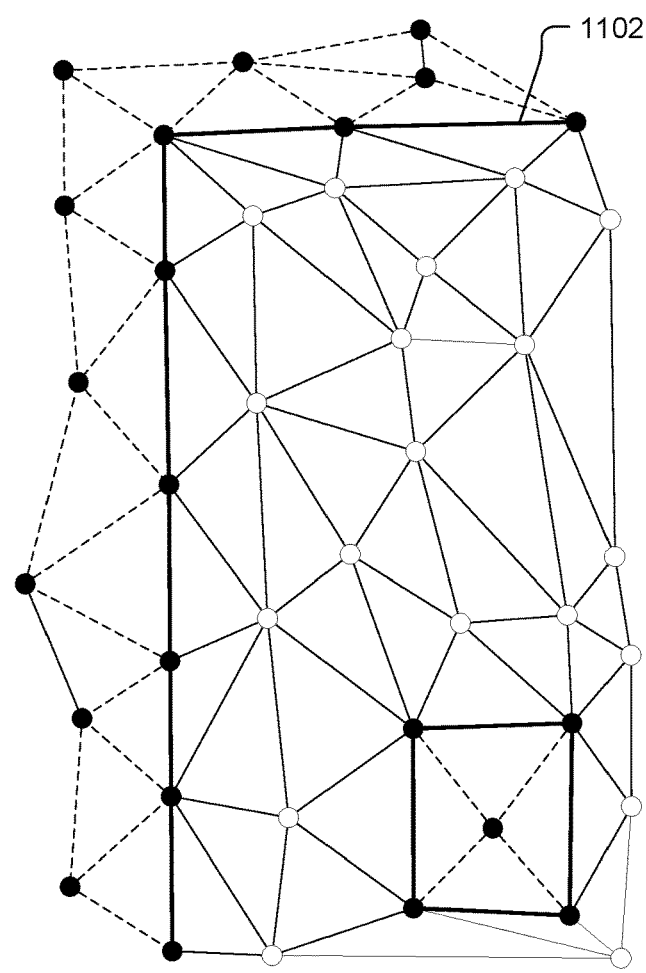

FIG. 11 provides an illustration of the set of points 1100 that may be generated by visualization systems according to some implementations. More particularly, the set of points 1100 may represent the set of points 1000 following the locating and marking of the non-manifold edges of the safe mesh (shown as bold lines), such as edge 1102.

Figure 12:
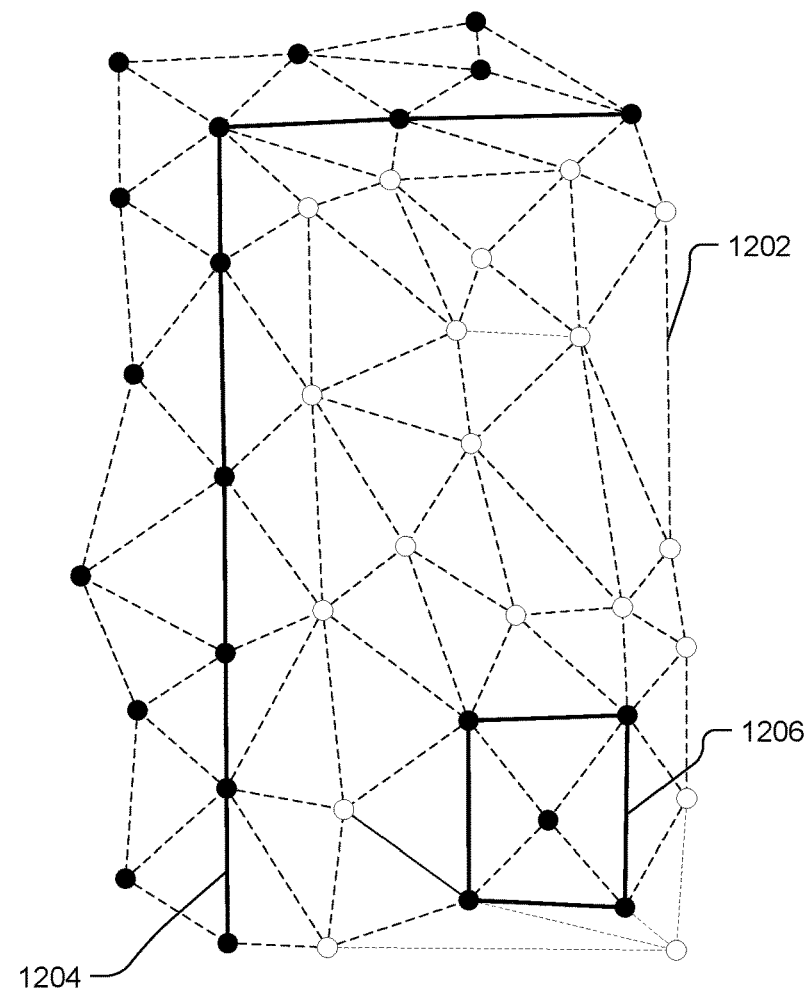

FIG. 12 provides an illustration of the set of points 1200 that may be generated by visualization systems according to some implementations. More particularly, the set of points 1200 may represent the set of points 1100 following the ignoring or removal of the unmarked edges of the safe mesh (shown as dashed lines), such as edge 1202. Further, the boundaries of the space 106 may now be seen from the connected marked edges. For example, referring to FIG. 1, the boundary 1204 may represent the portion of the wall in FIG. 1 including the wall mounted display. Similarly, the internal boundary 1206 may represent the table 108.

While the boundaries 1204-1206 are illustrated as being straight and relatively precise, depending on the density of the unsafe point data, visualization systems according to this disclosure may generate boundaries that deviate from the real-world geometry of the space 106. For example, the clear line of sight 714 allowed for points 716A-716 C to be generated and to represent the safe space between the table 108 and the wall of the space 106. In cases in which the use does not look in the direction indicated by arrow 714 from point 712, the boundary 1206 may bulge out and include the area of boundary 1206 and the safe area between the objects. In another example, due the lack of a clear line of sight from the safe point 712 to unsafe points on the far side of the table 108 (e.g. the table blocks the line of sight as used herein), the boundary for the table 108 may extend away from the actual geometry of the table on the far side to, for example, combine with a boundary of a nearby chair (not shown). To avoid such deviation, the user may walk around the far side of the table 108 or provides a clear line of sight for the inference of safe points on the far side of the table 108.

Once the visualization system has determined the boundaries 1204-1206, the visualization system may enter an operational mode. During operation, the boundaries may be utilized by visualization instructions which may update or warn the user regarding the user's relative location with respect to the detected boundaries (e.g. as the user moves around the space while interacting with the virtual environment).

In some virtual reality implementations, the visualization system may utilize external and internal boundaries to create a better visualization technique for boundaries than the existing techniques. The visualization system may begin by visualizing internal boundaries as grid meshes with height attached. For example, the table 108 may be about 20 inches high and, in turn, boundary 1206 may be visualized as a grid mesh box with a virtual height of about 20 inches.

In some examples, the visualization system may generate the virtual environment to such that the mesh fades away as the user leaves its proximity (e.g. moves more than one meter from the boundary), and fades in as the user approaches the boundary. In some cases, when the user gets very close (e.g. 0.5 meters), the visualization system may measure the velocity and field-of-view and project the box mesh upwards so it is always visible and it becomes opaque if the user is moving quickly. In this way, the visualization system may create an extended mesh that is non-intrusive during normal operation, but becomes noticeable when the user is nearing a collision.

In some implementations, the visualization system may perform various updates to the safe area during operation. For example, the visualization system may continue to collect point data regarding both unsafe points and safe points while the user is operating within the 3D application and use the additional point data to refine the boundaries. These updates may be activated manually, be performed periodically or be performed in real time as additional data is collected. Moreover, the visualization system may preserve the safe area and boundary information between sessions and perform updates at start up. A full determination of the safe boundaries may be triggered manually or performed upon degeneration that the visualization system is no longer located in the same space.

In another example, the visualization system may provide for user input regarding detected objects in the space. For example, the user may indicate that various objects are either permanent or temporary. Based on such metadata, the visualization system may selectively ignore or otherwise mark the nature of the obstacle or barrier in the space.

FIG. 13 is an example data flow diagram showing an illustrative data flow 1300 for determining boundaries in an environment according to some implementations. More particularly, data flow 1300 provides additional details related to the operation of some examples of the systems and methods disclosed herein At 1302, the data flow may to determine the pose of the headset device. The pose data may include, for example, the position and orientation of the headset device in relation to the space or virtual environment.

At 1304, the data flow may collect sparse data including data related to detected lines 1306, detected vertical planes 1308 and detected grounds planes 1310.

Next, at 1312, the data flow may determine safe point data in the space. As discussed above, the safe point data may include locations traversed by the user while wearing the headset device during the setup process.

At 1314, the data flow may detect obstacles in the space. Using the techniques discussed above with respect to FIGS. 1-12, the data flow may utilize the collected sparse data to generate unsafe point data related to obstacles and barriers in the space.

At 1316, the data flow may include filtering and processing the point data. Using the techniques discussed above regarding FIGS. 1-12, the filtering and processing functions may include functions for filtering unsafe point data based on proximity to detected vertical planes 1318, filtering unsafe point data based on metadata 1320, filtering unsafe point data based on vertical positioning of the unsafe points 1322, generating additional safe point data based on line of sight information 1324 and filtering unsafe point data based on safe concave hull analysis 1326.

At 1328, the data flow may project the processed and filtered point data from a 3D space onto a 2D plane. The projected point data may then be processed using a Delaunay triangulation to generate a Delaunay mesh at 1330. Finally, at 1332, the data flow may generate boundaries based on the Delaunay triangulation using the techniques discussed above with respect to FIGS. 1-12.

The aforementioned systems and techniques include a set of illustrative techniques for determining and using boundaries in a 3D application such as in virtual reality simulations. However, other techniques may be employed to accomplish similar results.

For example, while the boundary detection technique shown and described above utilized projection from 3D to 2D prior to performing Delaunay triangulation, implementations are not so limited.

For example, implementations may determine the boundary in three dimensions. In some examples, the technique may determine a three-dimensional boundary is similar in principle, with differences to account for additional dimensionality. First, the points may not be projected to a 2D plane, instead remaining 3D point locations. Second, 3D Delaunay triangulation may be performed instead of a 2D triangulation, generating tetrahedral simplices. Third, tetrahedral simplices rather than 2D triangles may be marked as "safe" if the tetrahedral simplices contain at least one "safe" point. Fourth, the mesh may be filtered to include only tetrahedrons that are marked as safe. Next, the boundaries of safe regions may be 3D surfaces consisting of triangles, rather than 2D line edges and may represent the boundaries of the volumes consisting of these tetrahedrons that are marked as safe. Finally, the safe boundaries may be a 3D surface consisting of triangle faces that may each be part of only one tetrahedron, rather than edges that may be a part of only one triangle.

Further, the same approach may be mathematically generalized to N>=2 dimensions. First, safe and unsafe points may be determined in N dimensions. Second, a N-dimensional Delaunay triangulation may be performed on these points, producing simplices of N+1 points in N dimensions. Next, simplices of N+1 points may be marked as safe if the simplices contain at least one safe point. Finally, boundaries of the safe region may consist of a "surface mesh" consisting of elements of N points, which may represent the set of mesh elements bordered by only one simplex.

Implementations considering higher dimensionality may have utility where time or other parameters are variables in a given application. For example, if a scene or detections within a scene are known to change with respect to time, the use of triangulation on 4D points (3D+time) may be advantageous. The visualization system may then evaluate sections or samples of the resulting 4D boundaries at specific times to visualize how the 3D safe boundary may change with respect to time.

In some implementations, the visualization systems described herein may utilize deep learning aided plane detection. In some cases, to enable improved automatic setup for spaces or other environment-dependent applications in AR/VR, the visualization system may recover the geometry of the space. While using sparse features or sparse lines as discussed above is an appropriate methods, planar regions more directly correspond to the major structural elements in a typical interior space. Deep learning aided plane detection may provide a method to robustly detect these planar regions which may aid in the setup process.

In this process, a deep neural net may be trained to recover surface normals from visible image inputs and, optionally, a map of discontinuities in depth. Next, a sequence of images (stereo or monocular) and IMU data may then processed. More particularly, a scale-accurate trajectory may be recovered by the visual-inertial (or stereo) SLAM. Next, the trajectory may be used in multi-view depth estimation using a framework like that in Large-Scale Direct SLAM (LSD-SLAM). After some number of frames and when scale-accurate semi-dense depth has been calculated, images from the sequence may be passed into a deep neural network trained to infer surface normal and, optionally, depth discontinuities. A flood-fill style algorithm may then be used to find near-constant segments in the surface normals, optionally using the inferred depth discontinuities to avoid filling across discontinuities.

Each plane segment is then processed. In particular, the segment normal may be estimated using an outlier-robust average, or a simple average. Next, the semi-dense depth map values may be optionally transformed to align with the plane normals, such that depth values which may be coplanar to the segment's normal may become constant across the image.

Then, the plane may be processed further using either traditional methods or deep learning methods.

If traditional methods are used, the planar region may be used as a seed to search for depth values consistent with the plane. Values inside the region may be preferred, and if they are self-consistent, a robust mean may be returned as the plane's inferred depth. Next, if depth values within the planar region do not meet a coverage threshold, then a flood fill/dilation may be used to expand the planar region, potentially using the inferred depth discontinuities to avoid expanding beyond the true underlying planar region. As the region is expanded in several iterations, each time the visualization system may check again if the depth inside the expanded plane region meet a self-consistent threshold sufficiently for the plane depth to be estimated.

On the other hand, if deep learning is used, the chosen assumed-planar region (and optionally surrounding planar regions), semi-dense depth map, and optionally the inferred discontinuity map, may be given by the visualization system as input to a deep neural net as input. The deep neural net receiving the input may be trained to recover the true depth of the planar region and a more precise planar region (expanded to truly fit the real underlying plane, even if the flood-fill output was partial).

Finally, the returned planar region that includes the recovered depth is used as part of a subsequent system. In some systems, the planar regions may be merged together over time using geometric consistency checks.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   non-transitory computer-readable media storing computer-executable instructions, which when executed by the one or more processors cause the one or more processors to:
   generate point data including a set of safe points in a space and a set of unsafe points in the space, the space surrounding a user device of the system;
   generate a triangulation over a union of the set of safe points and the set of unsafe points;
   determine triangles of the triangulation that include at least one safe point;
   determine edges of determined triangles which are part of a single triangle that includes at least one safe point; and
   determine one or more boundaries of the space using the determined edges.

2. The system as recited in claim 1, further comprising:
   one or more sensor components configured to capture feature data representing detected points of obstacles in the space;
   wherein the non-transitory computer-readable media stores additional computer-executable instructions, which when executed by the one or more processors cause the one or more processors to:
   determine the unsafe points based at least in part on the feature data.

3. The system as recited in claim 2, further comprising:
   one or more measurement units configured to capture pose data associated with the position and orientation of the user device in the space;
   wherein the non-transitory computer-readable media stores additional computer-executable instructions, which when executed by the one or more processors cause the one or more processors to:
   determine the unsafe points based at least in part on the pose data.

4. The system as recited in claim 3, further comprising:
   wherein the non-transitory computer-readable media stores additional computer-executable instructions, which when executed by the one or more processors cause the one or more processors to:
   determine the safe points based on pose data captured as a user moves the user device through the space.

5. The system as recited in claim 1, wherein the non-transitory computer-readable media stores additional computer-executable instructions, which when executed by the one or more processors cause the one or more processors to:
   prior to the generation of the triangulation, filter the unsafe points.

6. The system as recited in claim 5, wherein filtering the unsafe points includes removing at least one unsafe point within a threshold distance of a detected vertical plane.

7. The system as recited in claim 5, wherein filtering the unsafe points includes removing at least one unsafe point based on the vertical positioning of the unsafe points.

8. The system as recited in claim 5, wherein filtering the unsafe points includes:
   generating a concave hull around the safe points; and
   removing at least one unsafe point inside the concave hull that is surrounded by safe points.

9. The system as recited in claim 1, wherein the non-transitory computer-readable media stores additional computer-executable instructions, which when executed by the one or more processors cause the one or more processors to:
   prior to the generation of the triangulation, generate one or more additional safe points based on a clear line of sight between a previously generated safe point and an unsafe point.

10. The system as recited in claim 1, wherein the non-transitory computer-readable media stores additional computer-executable instructions, which when executed by the one or more processors cause the one or more processors to:
    prior to the generation of the triangulation, project the set of unsafe points and the set of safe points onto a horizontal plane.

11. The method as recited in claim 10, further comprising:
    prior to the generation of the triangulation, generating one or more additional safe points based on a clear line of sight between a previously generated safe point and an unsafe point.

12. The system as recited in claim 1, wherein the at least one safe point is included in the set of safe points.

13. A method comprising:
    generating, by a user device, point data including a set of safe points in a space and a set of unsafe points in the space, the space surrounding the user device;
    generating a triangulation over a union of the set of safe points and the set of unsafe points;
    determining triangles of the triangulation that include at least one point included in the set of safe points;
    determining edges of determined triangles which are part of a single triangle that includes the at least one point of the set of safe points; and
    determining one or more boundaries of the space using the determined edges.

14. The method as recited in claim 13, further comprising:
    determining unsafe points of the set of unsafe points based at least in part on feature data representing points of obstacles in the space and pose data associated with the position and orientation of the user device in the space.

15. The method as recited in claim 13, further comprising:
    determining safe points of the set of safe points based at least in part on pose data associated with the position and orientation of the user device in the space, the pose data captured as a user moved the user device within the space.

16. The method as recited in claim 13, further comprising:
prior to the generation of the triangulation, filtering points of the set of unsafe points by at least one of:
removing at least one first unsafe point within a threshold distance of a detected vertical plane;
removing at least one second unsafe point based on the vertical positioning of the unsafe points; and
removing at least one third unsafe point inside the concave hull around the safe points, the at least one third unsafe point being surrounded by safe points.

17. A non-transitory computer-readable media storing computer-executable instructions, which when executed by the one or more processors cause one or more processors to:
generate point data including a set of safe points in a space and a set of unsafe points in the space, the space surrounding a user device of the system;
generate a triangulation over a union of the set of safe points and the set of unsafe points;
determine triangles of the triangulation that include at least one safe point of the set of safe points;
determine edges of determined triangles which are part of a single triangle that includes at least one safe point of the set of safe points; and
determine one or more boundaries of the space using the determined edges.

18. The non-transitory computer-readable media as recited in claim 17, wherein the non-transitory computer-readable media stores additional computer-executable instructions, which when executed by the one or more processors cause the one or more processors to:
determine unsafe points of the set of unsafe points based at least in part on feature data representing points of obstacles in the space and pose data associated with the position and orientation of the user device in the space; and
determine safe points of the set of safe points based at least in part on the pose data associated with the position and orientation of the user device in the space, the pose data captured as a user moved the user device within the space.

19. The non-transitory computer-readable media as recited in claim 17, wherein the non-transitory computer-readable media stores additional computer-executable instructions, which when executed by the one or more processors cause the one or more processors to:
prior to the generation of the triangulation, filter the points of the set of unsafe points including at least one of:
removing at least one first unsafe point within a threshold distance of a detected vertical plane;
removing at least one second unsafe point based on the vertical positioning of the unsafe points; and
removing at least one third unsafe point inside the concave hull around the safe points, the at least one third unsafe point being surrounded by safe points.

20. The non-transitory computer-readable media as recited in claim 17, wherein the non-transitory computer-readable media stores additional computer-executable instructions, which when executed by the one or more processors cause the one or more processors to:
prior to the generation of the triangulation, generate one or more additional safe points based on a clear line of sight between a previously generated safe point and an unsafe point.

* * * * *